United States Patent
Shimbori et al.

(10) Patent No.: US 6,999,190 B2
(45) Date of Patent: Feb. 14, 2006

(54) PRINTING COST CHARGING SYSTEM

(75) Inventors: Satoshi Shimbori, Kanagawa (JP); Hitoshi Ueno, Saitama (JP); Norihisa Haneda, Saitama (JP); Yoshihiro Ito, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 955 days.

(21) Appl. No.: 09/833,737

(22) Filed: Apr. 13, 2001

(65) Prior Publication Data
US 2004/0204986 A1  Oct. 14, 2004

(30) Foreign Application Priority Data
Apr. 14, 2000  (JP) .............................. 2000-113918

(51) Int. Cl.
*G06F 15/00* (2006.01)

(52) U.S. Cl. .................. 358/1.15; 358/1.16; 358/1.18; 705/14

(58) Field of Classification Search ............... 358/1.15, 358/1.14, 1.13, 1.16; 709/203; 705/1, 8, 705/14, 27; 345/744; 714/47, 41
See application file for complete search history.

(56) References Cited

U.S. PATENT DOCUMENTS

| | | | | |
|---|---|---|---|---|
| 6,430,711 B1 * | 8/2002 | Sekizawa | ...................... | 714/47 |
| 6,628,415 B1 * | 9/2003 | Lawrence et al. | .......... | 358/1.15 |
| 6,636,329 B1 * | 10/2003 | Koppich et al. | ............ | 358/1.15 |
| 6,690,481 B1 * | 2/2004 | Yeung et al. | ............... | 358/1.15 |
| 6,795,205 B1 * | 9/2004 | Gacek | ........................ | 358/1.15 |

* cited by examiner

Primary Examiner—Kimberly Williams
Assistant Examiner—Satwant Singh
(74) Attorney, Agent, or Firm—Sughrue Mion, PLLC

(57) ABSTRACT

A printing system for performing printing of printing information corresponding to provided information provided by the Internet, includes: an information sending apparatus operable to provide the provided information; a terminal unit operable to print the printing information with a printer; and a printing managing apparatus operable to obtain a printing cost required for the printing by the printer and to compensate the printing cost.

18 Claims, 16 Drawing Sheets

FIG. 5

USER DATABASE 80

| USER ID | USER NAME | CONTACT INFORMATION | PRINTER ID | PRINTER TYPE | PAPER TYPE | INK CARTRIDGE TYPE | PRINTING COST PER SHEET (YEN) | ACCUMULATED POINTS | NUMBER OF SHEETS PRINTED IN A UNIT PERIOD |
|---|---|---|---|---|---|---|---|---|---|
| 1 | TARO YAMADA | xxx-xxxx-xxxx | 1 | CO. C, xxx | CO. C. COATED PAPER | xxx | 70 | 10000 | 9 |
| 2 | HANAKO YAMADA | yy-yyyy-yyyy | 2 | CO. E, yyy | CO. E. COATED PAPER | yyy | 80 | 15000 | 6 |
| | | | | | | | | | |
| | | | | | | | | | |

FIG. 6

SATISTICS DATABASE OF
USE OF INFORMATION
                    82

| PRINTING SOURCE URL | MONTH | NUMBER OF PRINTING REQUESTS | NUMBER OF PURCHASES |
|---|---|---|---|
| http://abc.efg.co.jp | JANUARY | 300 | 10 |
| | FEBRUARY | 350 | 5 |
| | MARCH | 250 | 15 |
| http://hij.klm.co.jp | JANUARY | 100 | 3 |
| | FEBRUARY | 50 | 2 |
| | MARCH | 150 | 10 |
| http://opq.rst.co.jp | JANUARY | 400 | 40 |
| | FEBRUARY | 600 | 12 |
| | MARCH | 500 | 35 |
| | | | |
| | | | |

PRINTING HISTORY DATABASE 84

| USER ID | POINT ISSUED DATE | OBJECT OF POINT ISSUANCE | PRINTING SOURCE URL | POINTS |
|---|---|---|---|---|
| 1 | JAN. 2 | PRINT ADVERTISEMENT | http://abc.efg.co.jp | 60 |
| 1 | JAN. 2 | PURCHASE AN ITEM WITH PRINTED ADVERTISEMENT WITH BAR CODE | http://abc.efg.co.jp | 80 |
| 1 | JAN. 3 | PRINT ADVERTISEMENT | http://hij.klm.co.jp | 70 |
| 1 | JAN. 4 | PRINT ADVERTISEMENT | http://opq.rst.co.jp | 30 |
| | | | | |
| | | | | |

*FIG. 7*

CONSUMABLES DATABASE 86

| ITEM ID | TRADER ID | MARKET PRICE |
|---|---|---|
| 1 | 1 | 750 |
| 1 | 2 | 750 |
| 1 | 3 | 700 |
| 2 | 1 | 760 |
| 2 | 2 | 760 |
| 2 | 3 | 800 |
|  |  |  |
|  |  |  |

FIG. 9

ORDER HISTORY DATABASE 88

| USER ID | ORDER DATE | ITEM ID | NUMBER ID | TRADER ID | ORDERING EXPENSE |
|---|---|---|---|---|---|
| 1 | JAN. 1 | 2 | 2 | 6 | 700 |
| 1 | JAN. 15 | 2 | 2 | 6 | 700 |
| 1 | FEB. 1 | 2 | 2 | 6 | 700 |
| 1 | FEB. 15 | 2 | 2 | 6 | 700 |

*FIG. 10*

TRADER DATABASE 90

| TRADER ID | TRADER NAME | DELIVERABLE AREA | Tel | e-mail |
|---|---|---|---|---|
| 1 | ZZZ | xxx, City x | XX-XXXX-XXXX | XX@XXXX |
| 2 | BBB | yyy, City y | YY-YYYY-YYYY | YY@YYYY |
|   |   |   |   |   |
|   |   |   |   |   |

*FIG. 11*

PRINTING COST CHARGING SYSTEM

The present patent application claims priority from a Japanese patent applications No. 2000-113918 filed on Apr. 14, 2000, the contents of which are incorporated herein by reference.

BACKGROUND OF THE INVENTION

1. Field of the Invention

The present invention relates to a printing system. More particularly, the present invention relates to a printing system in which printing information corresponding to information provided via the Internet is printed.

2. Description of the Related Art

Recently, information providers present advertisements on the Internets to users. Some users may print the advertisements in which the users feel interest in on paper by printers of the users and then look through the printed advertisements. In this case, the users can look through the printed advertisements anywhere at any time. Also, it is easy to compare the advertisements to each other. Thus, the printed advertisements have effects of increasing the users' desires of purchasing items on the advertisements. Therefore, the information provider, that is, the advertiser, wishes the advertisement to be printed with colors by all possible users in order to increase the effects of advertising.

In general, a cost required for printing, such as a cost of paper or ink used for the printing, is charged on the user. Since the user wishes to reduce the printing cost, the user usually likes monochrome printing, not color printing. Also, the user makes an effort to print less information. These facts prevent the increase of the effects of advertising.

SUMMARY OF THE INVENTION

Therefore, it is an object of the present invention to provide a printing system, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a printing system for performing printing of printing information corresponding to provided information provided by the Internet, includes: an information sending apparatus operable to provide the provided information; a terminal unit operable to print the printing information with a printer; and a printing managing apparatus operable to obtain a printing cost required for the printing by the printer and to compensate the printing cost.

In a preferred embodiment, the printing managing apparatus compensates the printing cost by charging the printing cost to the information sending apparatus.

The printing managing apparatus may manage the charging of the printing cost by using a point having substantially the same value as the printing cost, the point being usable on the Internet.

The provided information may be an advertisement, and the the point is provided when the advertisement is performed. The point may be electronic money.

When consumable items of the printer are replenished, the point may be used for payment of the consumable items.

The printer may include a printing certifying unit operable to electronically issue a printing certificate for certifying that the printer has been print the printing information fairly, and the printing managing apparatus may include a printing-with-point certifying unit operable to certifies the printing certificate. It is preferable that the printing certifying unit encrypts the printing certificate issued and the printing-with-point certifying unit decrypts the encrypted printing certificate.

The printing managing apparatus may determine whether or not a version of encryption software used for encrypting the printing certificate is the newest and allow the encryption software to be updated when the version of the encryption software is not the newest.

The printer may include a printing monitoring unit operable to monitor whether or not the printing has been finished normally, and the printing certifying unit may issue the printing certificate when the printing monitoring unit determines that the printing has been finished normally.

The printing monitoring unit may detect a type of paper to be used for the printing, and the printing certifying unit may issue the printing certificate when the printing monitoring unit determines that the detected type of paper is the same as a predetermined type of paper. Preferably, the printing managing apparatus includes a user database in which a printing environment of the printer is stored for each user, and the printing certifying unit issues the printing certificate, when the printing monitoring unit determines that the detected type of paper is the same as a type of paper registered in the user database.

The terminal unit may be operable to print further printing information other than the printing information for which the printing cost is compensated and to select whether or not the further printing information is added to the printing information.

The printing managing apparatus may include an identifying-information providing unit operable to add a user ID for specifying a user of the terminal unit and printing identifying information that specifies the contents of the printing information to the printing information. In this case, the printer may print the user ID and the printing identifying information as well as the printing information. The printing managing apparatus may obtain the user ID and the printing identifying information via the Internet to record the user ID and the printing identifying information therein.

The printing managing apparatus may include a user database in which a printing environment of the printer is stored for each user and a printing cost calculating unit operable to calculate the printing cost based on the contents of the user database and the printing certificate, depending on the printing environment.

The printing managing apparatus may include a printing history database in which a history of printings for each user, and restrict the number of sheets printed in a predetermined period so as no to exceed a predetermined limit.

The printing system may further include a consumables ordering apparatus operable to make the terminal unit to find the remaining amount of consumable items of the printer and to place an order of the consumable items based on the remaining amount of the consumable items found, wherein the point is used for a payment of the ordered consumable items.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 5 shows an exemplary user database.

FIG. 6 shows an exemplary statistics database of use of information.

FIG. 7 shows an exemplary printing history database.

FIG. 9 shows an exemplary consumables database.

FIG. 10 shows an exemplary order history database.

FIG. 11 shows an exemplary trader database.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
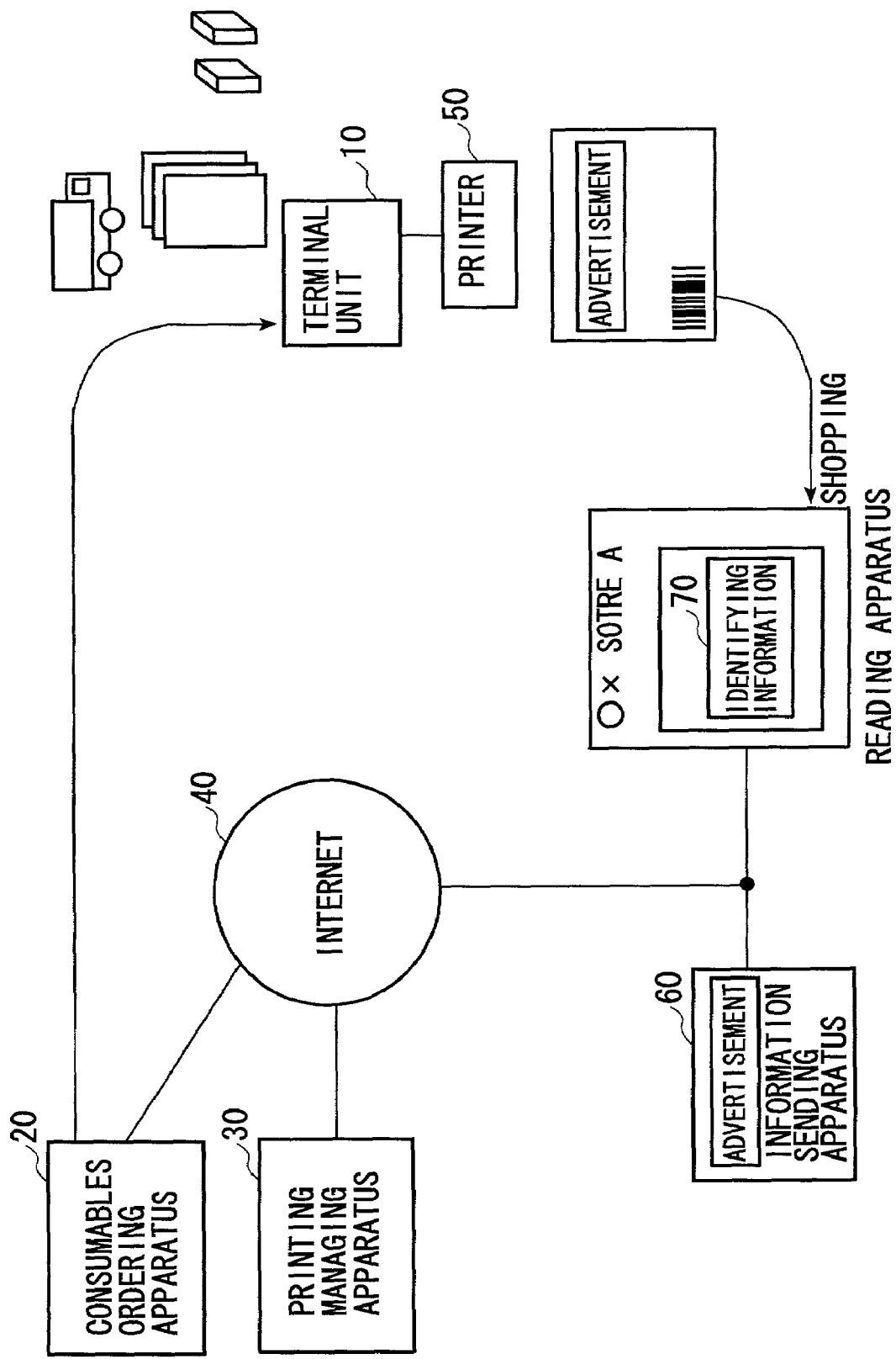
FIG. 1 schematically shows a system for printing an advertisement provided by the Internet according to the present embodiment.

FIG. 1 is a diagram schematically showing a system for printing an advertisement provided by the Internet 40 according to the present embodiment. The system includes a terminal unit 10, an information sending apparatus 60, a printing managing apparatus 30, a consumables ordering apparatus 20 and a reading apparatus 70 all of which are connected to the Internet 40, as shown in FIG. 1.

In the present embodiment, the information sending apparatus 60 provides an advertisement on the Internet 40 in accordance with a request from an advertiser who provides items or service. When a user prints out the advertisement on a sheet of paper, a cost required for the printing such as a cost of paper or ink is charged to the information sending apparatus 60. The charging of the printing cost to the information sending apparatus 60 is realized by giving the user points. Please note that in the present application the term "points" means compensation having substantially the same value as the printing cost. For example, electronic money is used as the points in order to compensate for the printing cost. The printing managing apparatus 30 manages a process for printing an advertisement for which the printing cost is charged on the information sending apparatus 60 in response to the user's request, and includes at least one database used for the management. The at least one database may include a printing history database in which a history of printing by each user that requires the compensation of the printing cost is recorded.

When the advertisement for which the printing cost is charged to the information sending apparatus 60 is printed out, a bar code, for example, in which information regarding the user who prints the advertisement and information regarding the printed advertisement are recorded is also printed. Such a printed advertisement with the bar code can be used in the following manner, for example. When the user wishes to buy the item or use the service that is an object of the printed advertisement, the user brings the printed advertisement with him/her to a shop or the like to show a shop clerk the printed advertisement. The information in the printed bar code is then read by an identifying-information reading apparatus 70 (i.e., a bar code reader in this example). The read information and the facts that the user bought the item or used the service are sent to the printing managing apparatus 30 to be recorded in the database included in the managing apparatus 30, as described in detail later.

By adding up the records in the database of the printing managing apparatus 30, information on a history of the advertisement printing by the user and information on cases in which the user who looked the advertisement bought the item or used the service shown on the advertisement can be obtained. Such information can be used for estimating the effect of advertising. Based on the estimation of the effect of advertising, more effective advertising can be realized.

The consumables ordering apparatus 20 checks the remaining amount of consumables, such as the number of sheets or the remaining amount of ink, used by the printer 50, and automatically places an order so as to avoid lack of consumable items.

Figure 2:
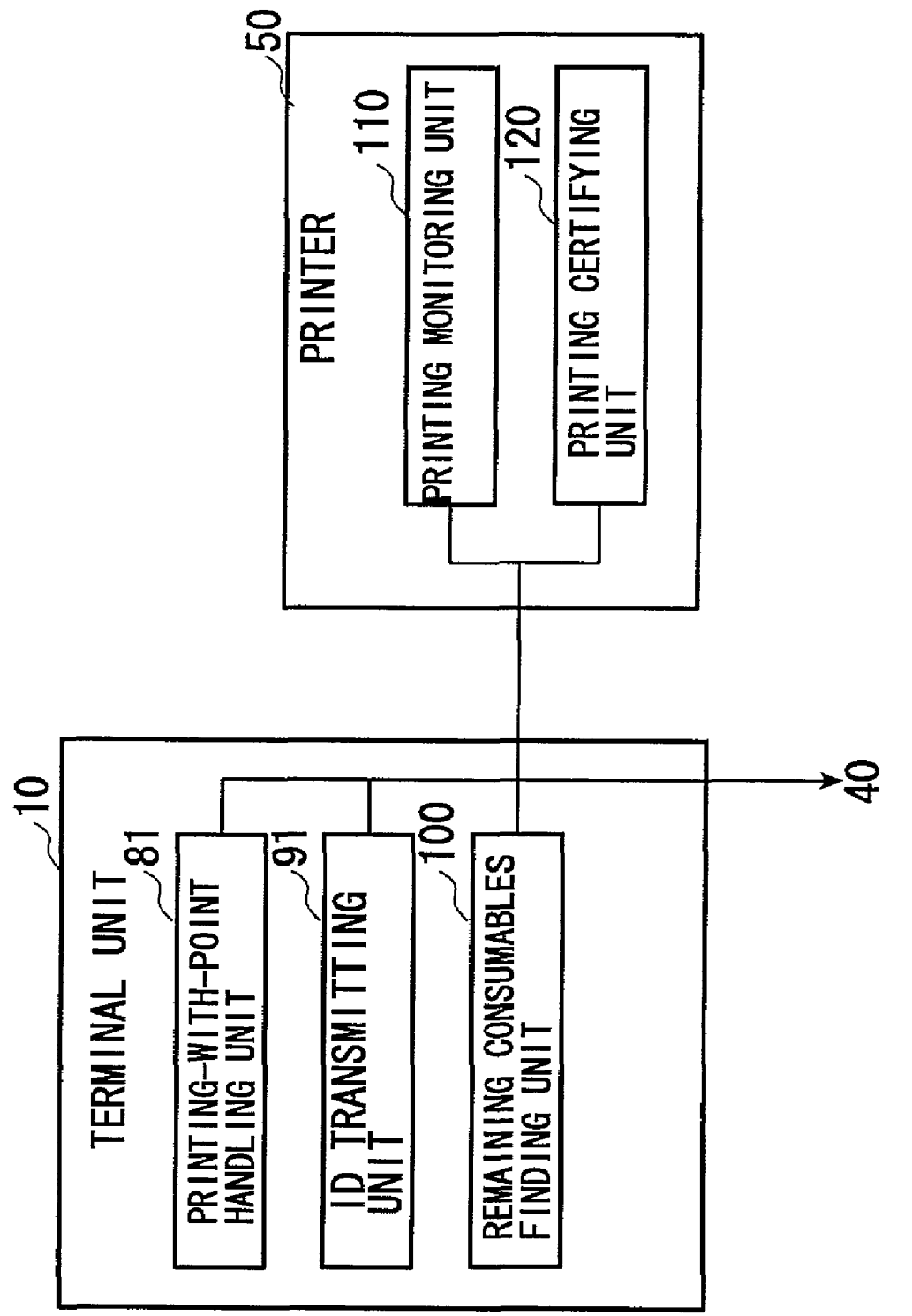
FIG. 2 schematically shows a structure of a printer.

FIG. 2 schematically shows structures of the terminal unit 10 and the printer 50. The terminal unit 10 includes a printing-with-point handling unit 81, an ID transmitting unit 91 and a remaining consumables finding unit 100.

The printing-with-point handing unit 81 performs printing of information to be printed with the points. The ID transmitting unit 91 transmits a printer ID specifying a printer used by the user and an item ID that is assigned to each item of the consumables used by the printer to the consumables ordering apparatus 20. The remaining consumables finding unit 100 finds the remaining amount/number of the consumables used by the printer.

The printer 50 includes a printing monitoring unit 110 and a printing certifying unit 120. The printing monitoring unit 110 monitors whether or not the printing has been finished normally, and whether or not paper that has been used in the printing is correct paper. The printing certifying unit 120 issues a certificate that certifies that the printing of the information with which the points are to be provided has been finished normally and fairly. The certificate may be realized by, for example, electronic signature. The issued certificate is encrypted by the printing certifying unit 120. The printing monitoring unit 110 and the printing certifying unit 120 are necessary to ensure that the points were fairly given to the printing.

Figure 3:
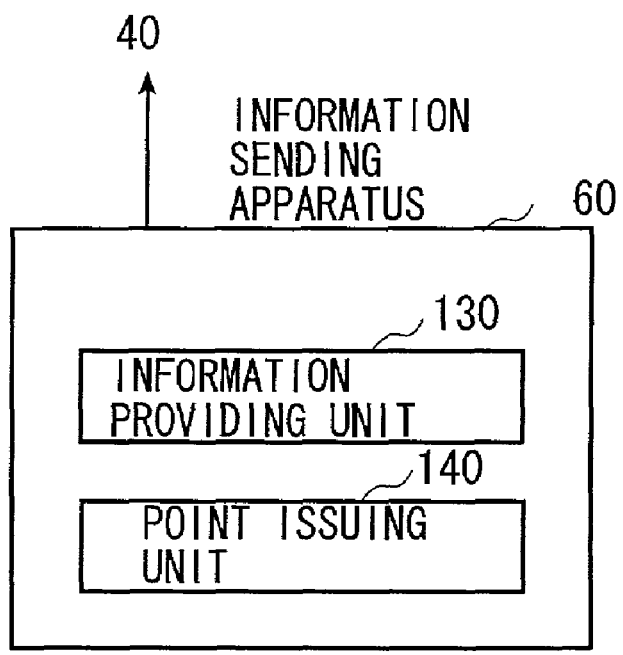
FIG. 3 schematically shows a structure of an information sending apparatus.

FIG. 3 schematically shows a structure of the information sending apparatus 60. The information sending apparatus 60 includes an information providing unit 130 and a point issuing unit 140, as shown in FIG. 3.

The information providing unit 130 presents an advertisement to the terminal unit 10 via the Internet 40. The point issuing unit 140 issues points in response to a request of points from the printing managing apparatus 30.

Figure 4:
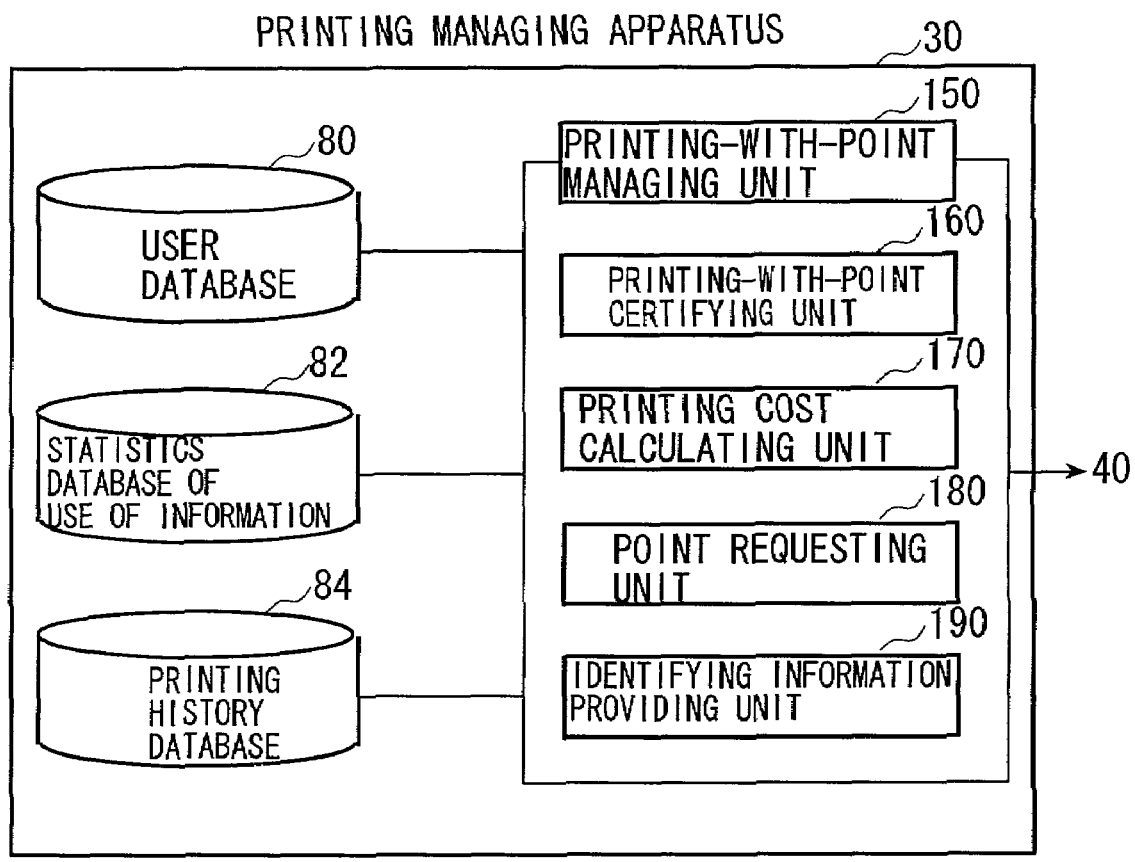
FIG. 4 schematically shows a structure of a printing managing apparatus.

FIG. 4 schematically shows a structure of the printing managing apparatus 30. The printing managing apparatus 30 mainly includes a printing with point managing unit 150 and at least one database.

The printing with point managing unit 150 includes a printing-with-point certifying unit 160, a printing cost calculating unit 170, a point requesting unit 180 and an identifying information providing unit 190, as shown in FIG. 4.

The printing with point certifying unit 160 certifies the printing certificate issued by the printing certifying unit 120 of the printer 50 after decrypting it.

The printing cost calculating unit 170 calculates the cost required for the printing with which the points are provided. The calculation may be performed by using a user database 80 included in the printing managing apparatus 30 described later.

The point requesting unit 180 charges the printing cost that has been certified by the printing with point certifying unit 160 to the information sending apparatus 60.

The identifying information providing unit 190 provides a user ID and identifying information that specifies the advertisement to be printed to information to be printed, such as the advertisement.

The printing managing apparatus 30 includes a user database 80, a statistics database of use of information 82, and a printing history database 84. Each database is described referring to a sample of the database next.

FIG. 5 shows a sample of the user database 80. This sample has fields for user ID, user name, contact information, printer ID, printer type, paper type, ink cartridge type, printing cost per sheet (yen), accumulated points, and number of sheets printed in a unit period, as shown in FIG. 5. In the user ID field, a user ID assigned to each user to specifying the user is stored. For each user, the contact information of the user, for example, phone number of e-mail address is recorded in the contact information field. Also, printing environment of the user is stored in the user database 80. More specifically, a printer ID assigned to the printer used by the user for specifying the printer, a printer type specifying the printer type, and a type of paper and a type of ink cartridge used in the printer are stored in the corresponding fields of the user database 80. The printing environment may be registered previously. Based on the information regarding the printing environment, the cost required for printing of one sheet of paper is calculated. The user is provided with the points as the compensation of the printing cost. The points provided to the user are accumulated, and the accumulated points are recorded in the accumulated point field of the user database 80. In the field of the number of printed sheets, it is stored how many sheets of paper the user performed printing on.

FIG. 6 shows a sample of the statistics database of the use of information 82. The database 82 has fields of, for example, a printing source URL specifying URL of a Web page showing the information printed, a month, the number of printing requests in the corresponding month, and the number of purchases in the corresponding month. That is, the database 82 shows how many times the printing was requested for each printing source of the printed information in a predetermined time period (i.e., one month) and how many printing requests caused the purchase or the use of the object of the advertisement, i.e., the item or the service. Thus, it is possible to quantitatively estimate the effect of advertising from variation in the number of the printing requests per month, which information source is now in favor, or a ratio of the number of the printing requests to the number of the purchases.

FIG. 7 shows a sample of the printing history database 84. The printing history database 84 includes fields of, for example, user ID, point issued date, object of point issuance, printing source URL and point, as shown in FIG. 7, so as to show for each user the accumulated points. Based on this database, the accumulated points and the number of sheets for which the user performed printing in a predetermined time period, that are to be recorded in the user database 80, can be calculated.

Figure 8:
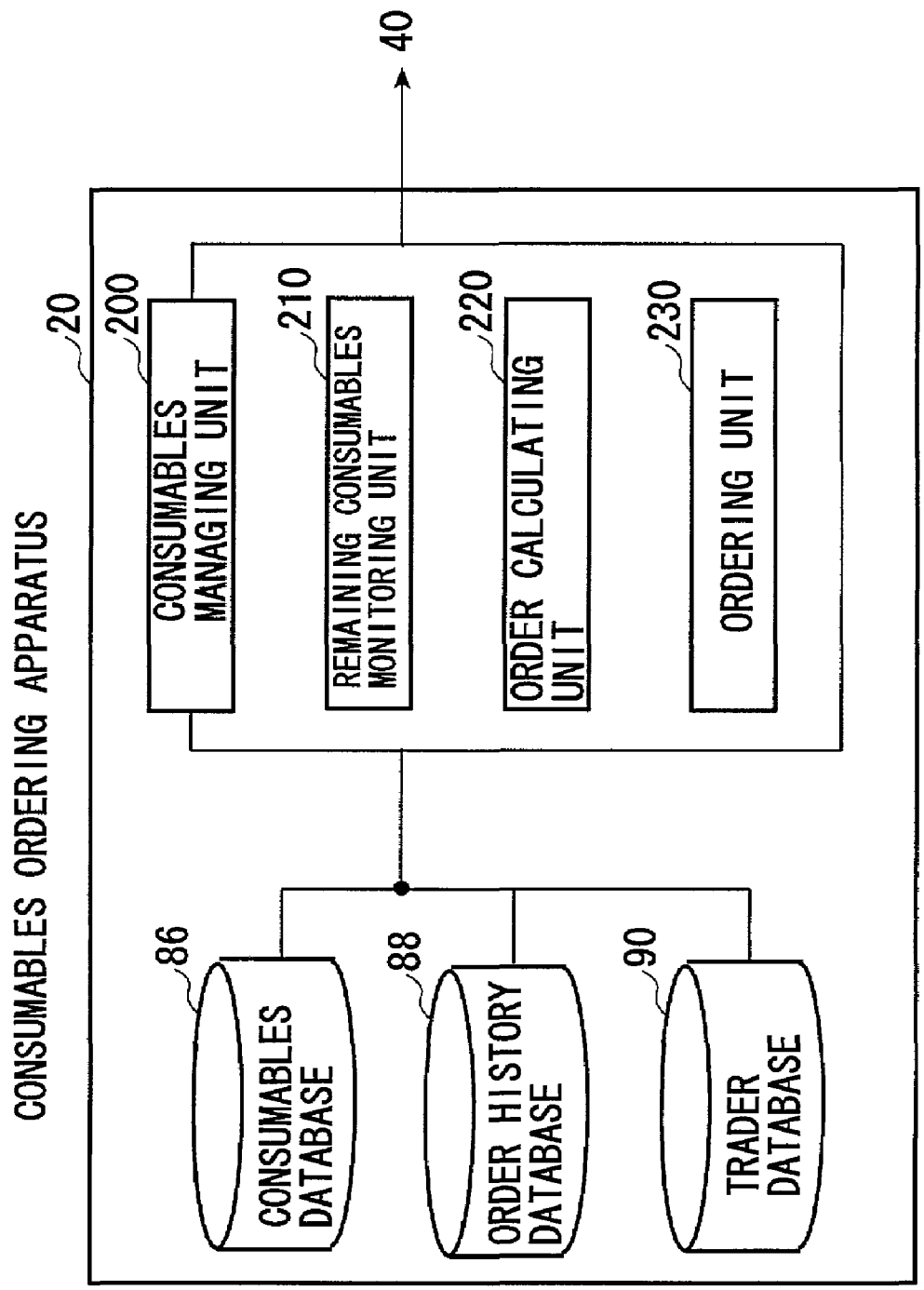
FIG. 8 schematically shows a structure of a consumables ordering apparatus.

FIG. 8 schematically shows a structure of the consumables ordering apparatus 20. The consumable ordering apparatus 20 includes a consumables managing unit 200 and at least one database.

The consumables managing unit 200 includes a remaining consumables monitoring unit 210, an order calculating unit 220 an ordering unit 220. The remaining consumables monitoring unit 210 issues an instruction to check the remaining amount of the consumables, such as the remaining amount of ink or the remaining number of sheets of paper, used by the printer 50. The order calculating unit 220 calculates the amount to be ordered in accordance with the degree of consumption by the user. The ordering unit 230 places an order of the amount determined by the ordering calculating unit 220.

The consumables ordering apparatus 20 in the present embodiment includes three databases, i.e., a consumables database 86, an order history database 88 and a trader database 90, as shown in FIG. 8. The details of the three databases are described below.

FIG. 9 shows a sample of the consumables database 86. The consumables database 86 has an item ID field in which an item ID assigned to each item of consumables is stored, a trader ID field in which a trader ID for specifying a trader who can handle the corresponding item, and a market price field in which the market price of the corresponding item is stored.

FIG. 10 shows a sample of the order history database 88. The order history database 88 records, for each user, a history of orders of the consumables. The order history database 88 in this sample has a plurality of fields in which the user ID of the user for whom an order of a certain item of the consumables was placed, the ordered date, the ordered number of the certain items, the trader ID of the trader to whom the order of the certain item was placed, and the cost required for placing the order are recorded, as shown in FIG. 10.

FIG. 11 shows an exemplary trader database 90. The trader database 90 of this example has a plurality of fields in which the trader ID, the name and contact information, such as a phone number or e-mail address, of the trader who can handle the consumables are stored. In addition, a deliverable area in which the trader can deliver the consumables at a constant fee may also be recorded in the trader database 90.

Figure 12:
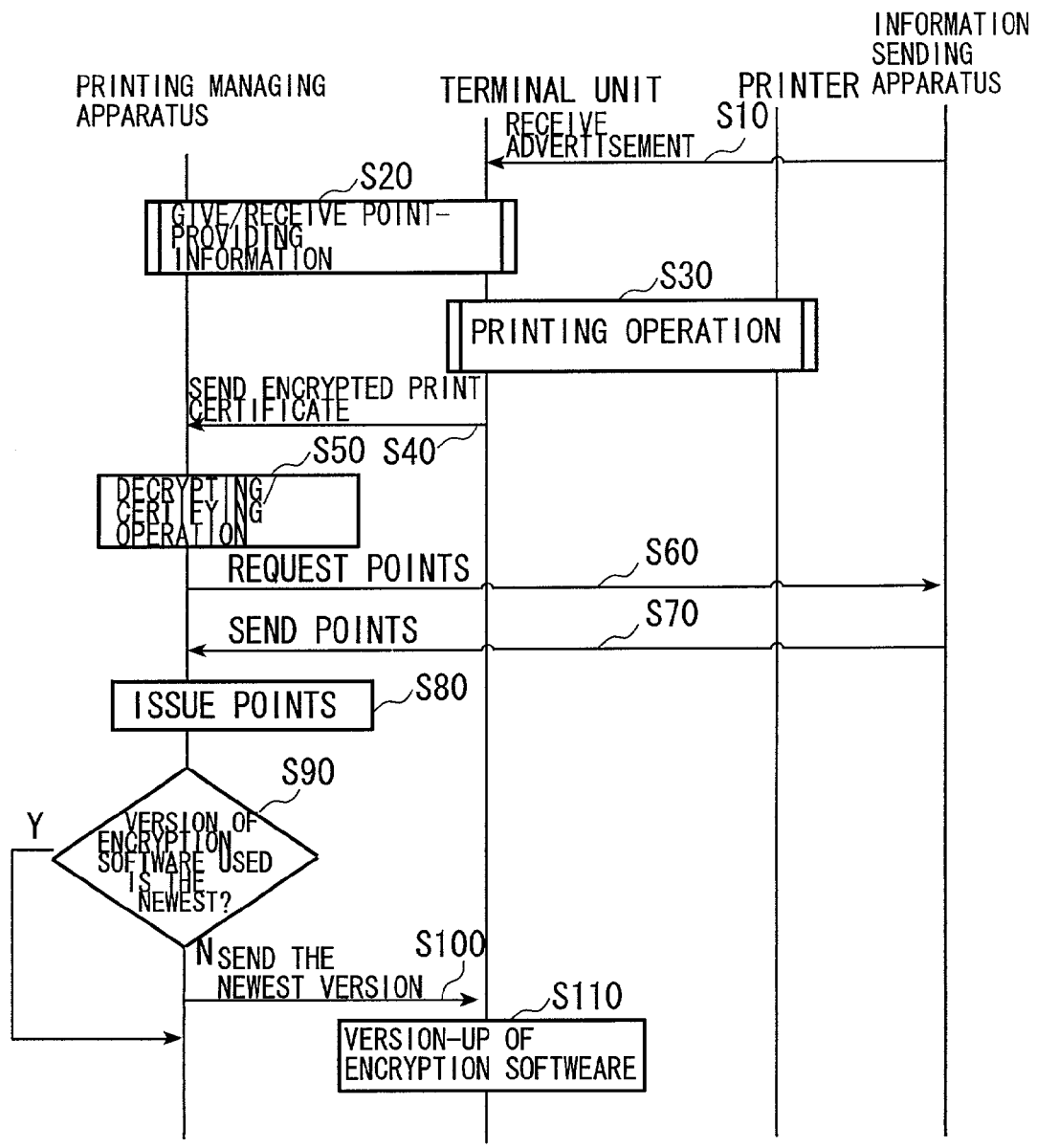
FIG. 12 is a sequence chart of an operation of the printing system according to the present invention.

FIG. 12 is a chart showing a sequence of an operation of the printing system according to the present invention. First, the user instructs the terminal unit 10 to access the Internet 40, so that the terminal unit 10 receives a Web page on the requested URL including an advertisement for which the printing cost is charged to the information sending apparatus 60 (Step S10) When the user wishes to print the advertisement, the terminal unit 10 requests the printing managing apparatus 30 to give point-providing information required for printing with points to the terminal unit 10, and then the requested information is transmitted to the terminal unit 10 (Step S20). This procedure is described in detail later. When the terminal unit 10 receives the point-providing information from the printing managing apparatus 30, the terminal unit 10 instructs the printer 50 to perform the printing operation (Step S30). The printing operation is described in detail later. In the printing operation, a printing certificate for certifying that the printing has been finished normally and fairly is electronically issued by the printer 50 to be sent to the terminal unit 10. The terminal unit 10 then transmits the printing certificate to the printing managing apparatus 30 after encrypting it (Step S40).

The printing managing apparatus 30 receives the transmitted printing certificate. The printing-with-point certifying unit 160 of the printing managing apparatus 30 decrypts and certifies the received printing certificate (Step S50). After the certifying operation has been finished, the point requesting unit 180 of the printing managing apparatus 30 requests the information sending apparatus 60 to issue points that can compensate the printing cost (Step S60). The information sending apparatus 60 then issues the points. The issued points are sent to the printing managing apparatus 30 (Step S70). The transmitted points are accumulated as the points of the user who has performed printing in the user database 80 (Step S80). In addition, a version-up operation for encryption software used by the user may be performed, if necessary. In the version-up operation, the printing managing apparatus 30 checks the version of the encryption software used by the user for encrypting the printing certificate in Step S30 (Step S90). If the version of the encryption software is not the newest, the newest version is sent to the terminal unit 10 (Step S100) so as to update the version of the encryption software of the user to be the newest one (Step S110).

Figure 13:
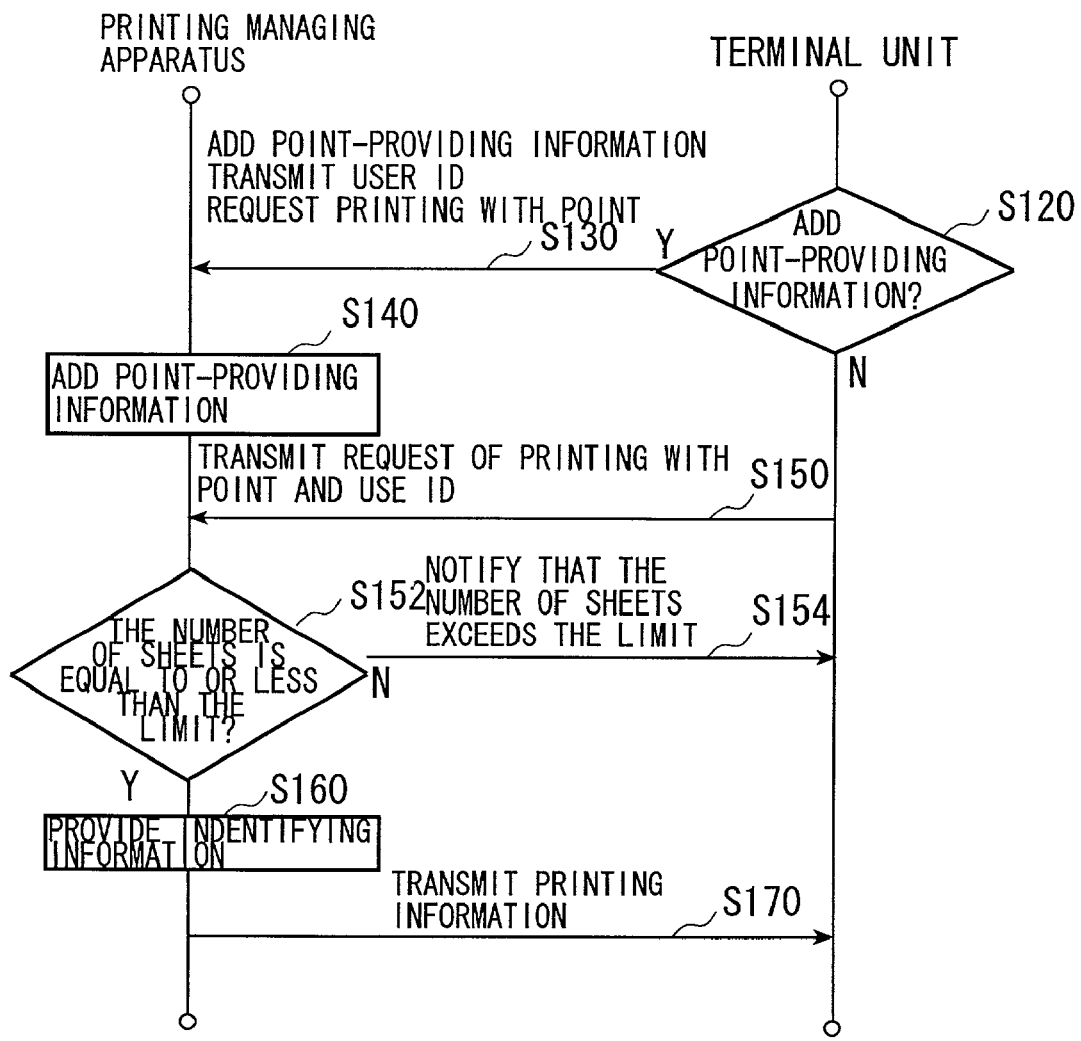
FIG. 13 is a sequence chart of a procedure in which point-providing information is transferred.

FIG. 13 is a chart showing a sequence of the procedure in Step S20 in which the point-providing information required for the printing with points is transmitted. First, the terminal unit 10 determines whether or not the point-providing information is to be added to the advertisement provided by the information sending apparatus 30 (Step S120). When it is determined that the point-providing information is to be added, the user ID, a request for performing printing with points and a request for adding the point-providing information are sent from the terminal unit 10 to the printing managing apparatus 30 (Step S130). The point-providing information is then added to the information to be printed (Step S140).

In a case where the user requests printing of an advertisement of a suit provided by the information provider, for example, another advertisement of a necktie can also be printed in addition to the advertisement of the suit, and the printing cost required for printing the advertisements of the suit and the necktie is also charged to the information sending apparatus 60. The advertisement of the necktie may be stored in the printing managing apparatus 30 previously so that it can be presented to the terminal unit 10 when the terminal unit 10 selects the addition of the point-providing information to the advertisement of the suit in Step S120. In this case, it is possible to provide advertisements of items or services widely covering the user's interests.

The advertisement provided by the information provider may be a normal advertisement for which the printing cost is not charged to the information sending apparatus 60. In this case, not only the printing cost required for the printing with points but also the printing cost required for the other printing may be charged together to the information sending apparatus 60.

On the other hand, when it is not determined that the point-providing information is to be added in Step S120, only the request for performing the printing with points and the user ID are transmitted to the printing managing apparatus 30 (Step S150).

The printing-with-point managing unit 150 checks the number of the sheets on which the printing with point was performed by the user in a predetermined period based on the user database 80 (Step S152). The number of the sheets thus checked exceeds a predetermined number, i.e., the limit, the printing-with-point managing unit 150 notifies the terminal unit 10 that the number of the printed sheets exceeds the limit so as to prevent the printing with point (Step S154). Thus, it is possible to prevent the printing with point from being performed excessively.

When the number of the sheets checked in Step S152 does not reach the limit, the identifying information providing unit 190 of the information sending apparatus 60 provides the advertisement which is requested to be printed with identifying information that identifies the advertisement and the user ID that identifies the user who issues the request for printing the advertisement (Step S160). The identifying information and the user ID are incorporated into, for example, a bar code. Then, the information to be printed is transmitted to the terminal unit 10 (Step 170).

Figure 14:
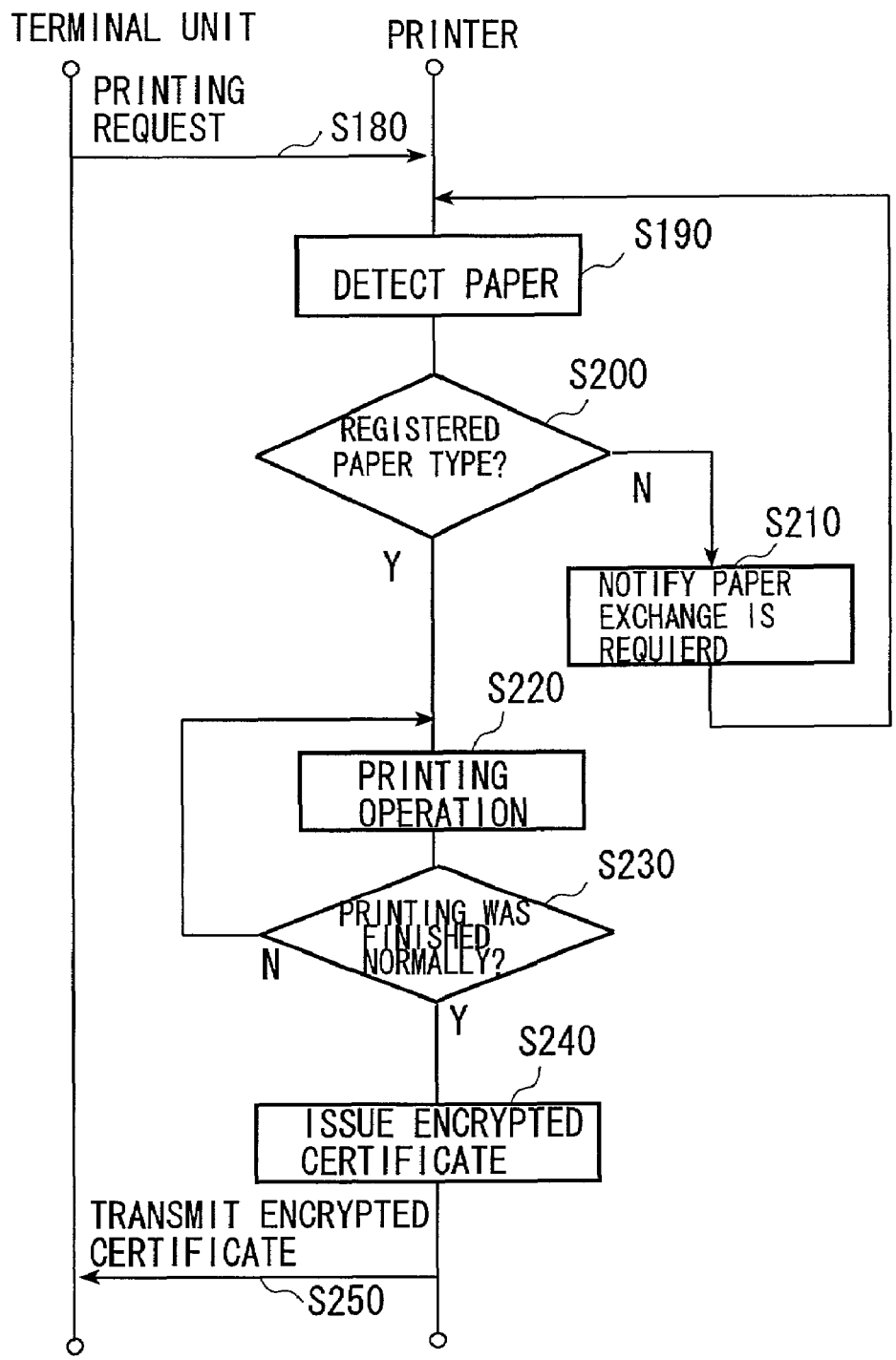
FIG. 14 is a sequence chart of a printing operation.

FIG. 14 is a chart showing a sequence of the printing operation in Step S30. When the printer 50 receives the printing instruction from the terminal unit 10, the printing monitoring unit 110 of the printer 50 detects paper to be used for the printing (Step S190). The detection of the paper may be performed with, for example, an optical sensor. It is then determined whether or not the detected paper is the same as the paper registered as the one the user uses in the user database 80 (Step S200). When the detected paper is different from the registered paper, it is notified that paper exchange is necessary (Step S210). On the other hand, when the detected paper is the same as the registered paper, the printing operation is performed (Step S220). The printed matter includes the advertisement requested by the user and the bar code that can specify the user, the advertisement and the like. After the printing operation, the printing monitoring unit 110 of the printer 50 determines whether or not the printing operation has been finished normally (Step S230). In a case where the printing has not been normally, the printing is tried again. When it is determined that the printing has been finished normally, the printing certifying unit 120 issues an encrypted printing certificate (Step S240), and transmits it to the terminal unit 10 (Step S250). The printing certificate includes information that specifies the user and the advertisement printed by the user and information that indicates the number of sheets of paper on which the user has printed the printing information. The printing certificate can be decrypted and certified by the printing managing apparatus 30.

Figure 15:
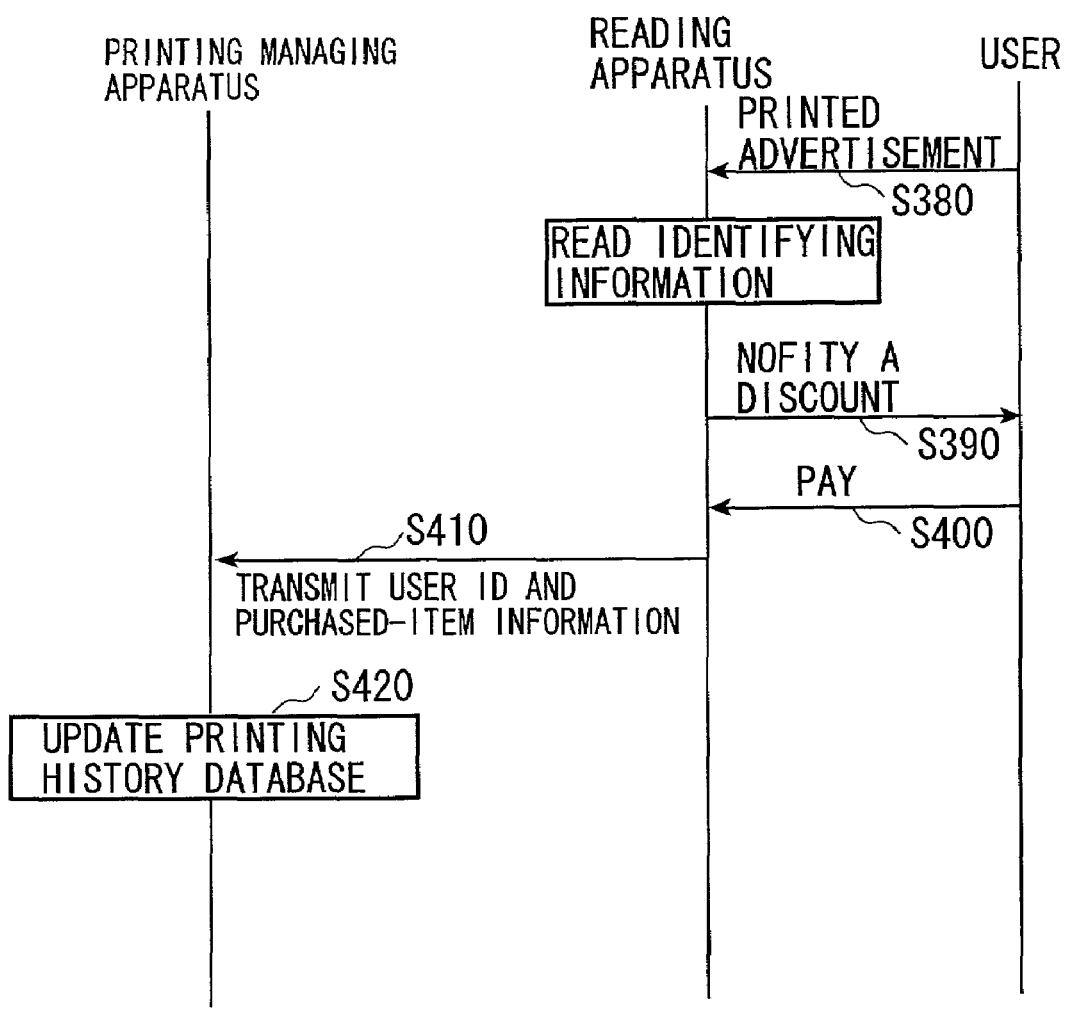
FIG. 15 is a chart showing an exemplary sequence of the use of a printed advertisement.

FIG. 15 is a chart showing an exemplary sequence of the use of the printed advertisement. The user who printed the advertisement brings the printed matter including the advertisement and the bar code to a shop where the reading apparatus 70 is placed (Step S380). The reading apparatus 70 may be a bar code reader incorporated in a cash register of the shop, for example, and reads the information of the bar code. For example, in a case where the user wishes to buy an item shown on the printed advertisement, the user brings the printed advertisement to the shop and presents the printed advertisement to a shop clerk handing the cash register. The information included in the printed bar code is read by the reading apparatus 70 at the cash register. Then, a discount obtained by showing the printed advertisement may be shown to the user who brings the printed advertisement (Step S390). In this case, the user can buy the item at a reduced price (Step S400).

When the user has paid for the item, information regarding the item the user bought and the user ID of the user are transmitted to the printing managing apparatus 30 (Step S410). The transmitted information and the user ID are stored in the printing history database 84, thereby updating the printing history database (Step S420). Thus, a history of the user's purchases can be stored in the database.

Figure 16:
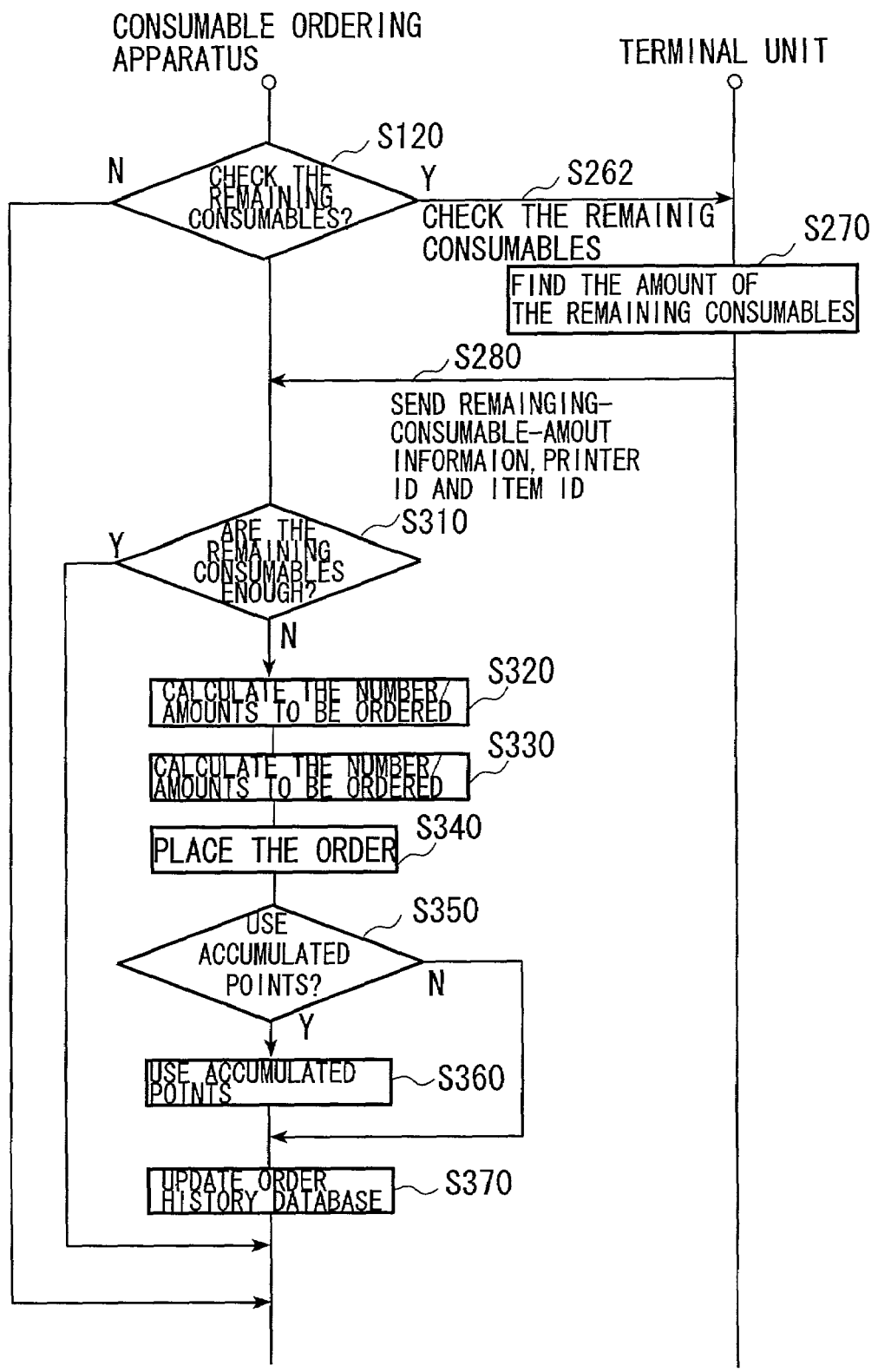
FIG. 16 is a sequence chart of an operation for automatically placing an order of a consumable item.

FIG. 16 is a chart showing a sequence in which the system according to the present invention automatically places an order of a consumable item used by the printer. The consumables ordering apparatus 20 determines whether or not the check of the remaining amount of the consumables used by the printer, such as paper or ink, should be performed now (Step S260). For example, this determination is performed in the following manner. First, a consumption speed of the consumables of the printer is calculated based on the order history database 88. From the calculated consumption speed, it can be found when the consumables of the printer are completely consumed. Thus, a time at which the check of the remaining amount of the consumables is to be performed can be set so that an enough time period for ordering and delivering the consumables of the printer can be secured before the consumables are completely consumed. At the thus set time, the check of the remaining amount of the consumables of the printer is performed. Alternatively, the check of the remaining amount of the consumables may be performed at predetermined intervals. When it is determined that the check of the remaining amount of the consumables should be performed now in Step S120, an instruction to check the remaining amount of the consumables is transmitted to the terminal unit 10 (Step S262). Otherwise, the procedure in this sequence is finished.

Then, the terminal unit 10 makes the remaining amount monitoring unit 210 of the printer 50 check the remaining amount and the consumed amount of the consumables of the printer 50 (Step S270). The found remaining amount and the consumed amount of the consumables are transmitted to the terminal unit 10 together with the printer ID and the item ID of each item of the consumables (Step S280).

The consumables managing unit 200 determines whether or not the remaining amount of the consumables is enough (Step S310). In the determination, a value set for each printer based on the contents of the order history database 88 and the remaining amount and the consumed amount of the consumables of the printer is used as a reference of the determination. As the speed of consuming the consumables by the printer becomes larger, the reference value is increased. For example, in a case where the remaining amount of the consumables of a printer having a larger consumption speed and that of another printer having a smaller consumption speed are the same, since the reference values for these printers are different, only the remaining amount of the printer having the larger consumption speed may reach the reference value. In this case, an order of the consumables of the printer having the smaller consumption speed is not placed. As described above, it is possible to place an order of the consumables depending on a manner of consumption of each printer.

When the remaining amount of the consumables is determined to be enough in Step S310, the procedure is finished. On the other hand, when the remaining amount of the consumables is not enough, the amount to be ordered is calculated by the order amount calculating unit 220 (Step S320). The amount to be ordered is determined depending on the consumption speed of the consumables. In a case of the printer having the larger consumption speed, the amount to be ordered at a time is determined to be proportional to an average of the consumed amount of the consumables in a constant time period, for example.

Then, a trader to whom the order of the consumables is placed is determined by the consumables managing unit 200 of the consumables ordering apparatus 20. The trader is determined based on the contents of the trader database 90 and the consumables database 86. More specifically, among the traders registered in the trader database 90 each of who has the deliverable area covering the user's address, one trader having the most inexpensive market price is selected referring to the consumables database 86. After the amount to be ordered and the trader are determined, the order is actually placed to the determined trader (Step S340). As described above, the total cost for placing the order of the consumables can be reduced by selecting one of the traders each having the deliverable area with a constant delivery fee that covers the user's address, who has the most inexpensive market price.

In the payment for the ordered item, points available on the Internet 40 that has the same value as cash, such as electronic money may be used. For such points, depositing and withdrawing may be managed by the consumables ordering apparatus 20 or the terminal unit 10. Moreover, the printing-with-point managing unit 150 of the printing managing apparatus 30 may manage the depositing and withdrawing of the points by using the user database 80 of the printing managing apparatus 30.

After the order has been placed, it is determined whether or not the points are available (Step S350). In a case where the user has the accumulated points that can be used for the payment, the points corresponding to the charge of the ordered item are withdrawn fro the user's accumulated points (Step S360). In another case where the points are not used, the process in Step S360 is skipped.

Finally, the order of the consumable item at this time is recorded into the order history database 88 (Step S370).

Although the consumables ordering apparatus 20 is described as a separate apparatus from the terminal unit 10 in the above embodiment, the consumables ordering apparatus 20 may be included in the terminal unit 10. Moreover, the trader to whom the order of the item of the consumables is placed may have an electronic shop. The electronic shop can receive an order of an item of the consumables by e-mail from the user and can deliver the ordered item to the user. By using the electronic shop, the processes from the check of the remaining amount of the consumables of the printer to the order can be performed on line.

In the above description, an example in which the accumulated points are used for the payment of the consumable items is described. However, the use of the accumulated points is not limited thereto, as long as the accumulated points are directly or indirectly returned back to the user as the compensation for the printing cost. For example, the user may receive a coupon or the like allowing the user received it to have a free lunch in accordance with the accumulated points.

In addition, the number of the points provided when the advertisement is printed out may be changed depending on the total number of the users who printed the advertisement. For example, the number of the points to be provided may increase with the increase of the number of the users printing the advertisement. Also, the number points to be provided may be changed depending on a type of the advertisement or the contents of the advertisement, i.e., an item or a service shown on the advertisement. In these cases, it is possible to increase the effects of advertising.

As is apparent from the above description, according to the present invention, the user can print the advertisement without being anxious about the printing cost. Moreover, since the printed advertisement provides a discount or the like to the user, the number of the printings of advertisement in which people show interest can be increased. Therefore, the advertiser can achieve the larger effects of advertising.

Although the present invention has been described by way of exemplary embodiments, it should be understood that those skilled in the art might make many changes and substitutions without departing from the spirit and the scope of the present invention which is defined only by the appended claims.

What is claimed is:

1. A printing system for printing information received by a user via the Internet, comprising:
   an information sending apparatus operable to provide information via the Internet;
   a terminal unit for receiving said information provided by said information sending apparatus and operable to print said information with a printer; and
   a printing managing apparatus operable to obtain a printing cost for printing said information by said printer and to compensate a user for said printing cost, said printing managing apparatus compensating a user for said printing cost by charging said printing cost to said information sending apparatus, and said printing managing apparatus charging said printing cost to said information sending apparatus by means of a point having substantially the same value as said printing cost, said point being usable on the Internet;
   wherein said printing managing apparatus comprising: a statistics database for storing the number of printing request of said information form said terminal unit and the number of purchases of advertised objects by said information.

2. A printing system as claimed in claim 1, wherein said information provided by said information providing system is an advertisement, and said point is provided when said advertisement is printed.

3. A printing system as claimed in claim 1, wherein said point is electronic money.

4. A printing system as claimed in claim 1, wherein said point is applied as payment to replenish consumable items of said printer.

5. A printing system as claimed in claim 1, wherein said printer includes a print certifying unit operable to issue an electronic certificate for certifying that said printer has printed said information satisfactorily, and
   said printing managing apparatus includes a point certifying unit operable to certify said electronic certificate issued by said print certifying unit.

6. A printing system as claimed in claim 5, wherein said print certifying unit encrypts said electronic certificate, and
   said point certifying unit decrypts said encrypted electronic certificate.

7. A printing system as claimed in claim 6, wherein said printing managing apparatus determines whether or not a version of encryption software for encrypting said electronic certificate is the newest, and allows said encryption software to be updated when said version of said encryption software is not the newest.

8. A printing system as claimed in claim 5, wherein said printer includes a printing monitoring unit operable to monitor whether or not said printing of said information has been finished satisfactorily, and
   said print certifying unit issues said electronic certificate when said printing monitoring unit determines that said printing of said information has been finished satisfactorily.

9. A printing system as claimed in claim 5, wherein said printing monitoring unit detects a type of paper to be used for said printing, and
   said print certifying unit issues said electronic certificate when said printing monitoring unit determines that said type of paper is a predetermined type of paper.

10. A printing system as claimed in claim 9, wherein said printing managing apparatus includes a user database with a printing environment of said printer stored for each user, and
    said print certifying unit issues said electronic certificate when said printing monitoring unit determines that said type of paper is a type of paper registered in said user database.

11. A printing system as claimed in claim 1, wherein said terminal unit is operable to print information other than said information for which said printing cost is compensated, and to select whether or not said other information is added to said information for which said printing cost is compensated.

12. A printing system as claimed in claim 1, wherein said printing managing apparatus includes an identifying-information providing unit operable to add a user ID for specifying a user of said terminal unit and printing identifying information, which specifies the contents of said information, to said information,
    said printer prints said user ID and said printing identifying information as well as said information, and
    said printing managing apparatus obtains said user ID and said printing identifying information via the Internet to record said user ID and said printing identifying information therein.

13. A printing system as claimed in claim 5, wherein said printing managing apparatus includes a user database in which a printing environment of said printer is stored for each user and a printing cost calculating unit operable to calculate said printing cost based on the contents of said user database and said electronic certificate.

14. A printing system as claimed in claim 1, wherein said printing managing apparatus includes a printing history database having a printing history for each user, and restricts a number of sheets printed in a predetermined period for a user so as not to exceed a predetermined limit.

15. A printing system as claimed in claim 1, further comprising a consumable ordering apparatus operable to make said terminal unit find a remaining amount of consumable items of said printer and to place an order for said consumable items based on said remaining amount of said consumable items,
    wherein said point is applicable as payment for said ordered consumable items.

16. A printing system for compensating a user for printing information received by the user via the Internet, comprising:
    an information sending apparatus operable to provide information via the Internet to a terminal unit that is operable to print said information with a printer; and
    a printing managing apparatus operable to obtain a printing cost for printing said information by said printer and to compensate a user for said printing cost, said printing managing apparatus compensating a user for said printing cost by charging said printing cost to said information sending apparatus by means of a point having substantially the same value as said printing cost, said point being usable on the Internet;
    wherein said printing managing apparatus comprising: a statistics database for storing the number of printing request of said information from said terminal unit and the number of purchases of advertised objects by said information.

17. A printing system as claimed in claim 12, wherein said contents of said information provided by said information sending apparatus is an advertisement and said printing managing apparatus obtains said user ID and said printing identifying information via Internet from a shop selling an object in relation to said advertisement brought by said user.

18. A printing system as claimed in claim 17, said user ID and said printing identifying information are decoded in a bar code.

* * * * *